No. 842,859. PATENTED FEB. 5, 1907.
M. C. CLARK.
MOLD FOR MANUFACTURING RUBBER FOOTWEAR.
APPLICATION FILED JUNE 8, 1906.

3 SHEETS—SHEET 1.

WITNESSES: INVENTOR
Maurice C. Clark
BY
ATTORNEYS

No. 842,859.  
PATENTED FEB. 5, 1907.

M. C. CLARK.  
MOLD FOR MANUFACTURING RUBBER FOOTWEAR.  
APPLICATION FILED JUNE 8, 1906.

3 SHEETS—SHEET 2.

WITNESSES:

INVENTOR  
Maurice C. Clark.  
BY  
Gifford & Bull  
ATTORNEYS

No. 842,859. PATENTED FEB. 5, 1907.
M. C. CLARK.
MOLD FOR MANUFACTURING RUBBER FOOTWEAR.
APPLICATION FILED JUNE 8, 1906.

3 SHEETS—SHEET 3.

WITNESSES:

INVENTOR
Maurice C. Clark
BY
Gifford & Bull
ATTORNEYS

UNITED STATES PATENT OFFICE.

MAURICE C. CLARK, OF PROVIDENCE, RHODE ISLAND.

MOLD FOR MANUFACTURING RUBBER FOOTWEAR.

No. 842,859.　　　　Specification of Letters Patent.　　　　Patented Feb. 5, 1907.

Application filed June 8, 1906. Serial No. 320,698.

*To all whom it may concern:*

Be it known that I, MAURICE C. CLARK, a citizen of the United States, and a resident of Providence, in the county of Providence and State of Rhode Island, have invented a new and useful Improvement in Molds for Manufacturing Rubber Footwear, of which the following is a specification.

This invention relates to certain novel and useful improvements in manufacture of rubber footwear, and has particular application to improvements in the construction and arrangement of the vulcanizing-mold parts.

In the ordinary process of manufacturing molded rubber footwear a four-part mold is usually employed, the side molds or parts being divided on the center line of the bead of shoe from heel to toe, and where the side parts come together over the vamp there is usually formed upon the shoe a seam, rib, or fin of rubber which extends from the opening at the top of the shoe down across the instep and to the end of the toe where the upper joins the toe. This is to some extent disadvantageous from a commercial standpoint, as it mars the appearance of the shoe, and also for the further reason that where these side molds join on the center line they are liable to pinch or crimp the lining of the shoe in between the two parts, and when this occurs the article is damaged in most instances to such an extent as to render it unfit for sale.

To overcome the objections above recited and to mold a shoe which, in addition to being free from crimps in the lining, will present a neat appearance, and to accomplish this purpose, I form my mold as hereinafter described.

The invention consists in the construction, combination, and arrangement of parts set forth in and falling within the scope of the appended claims.

Figure 1:
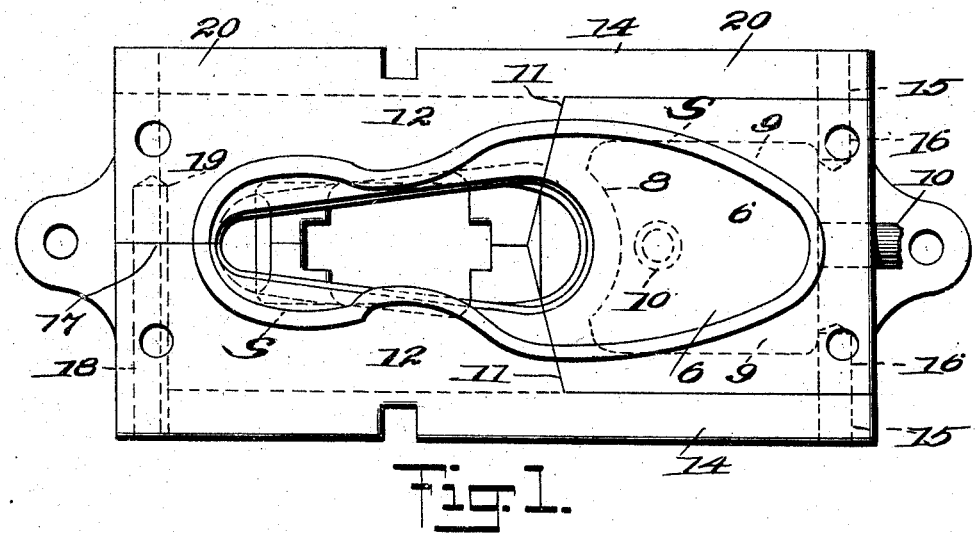
Figure 2:
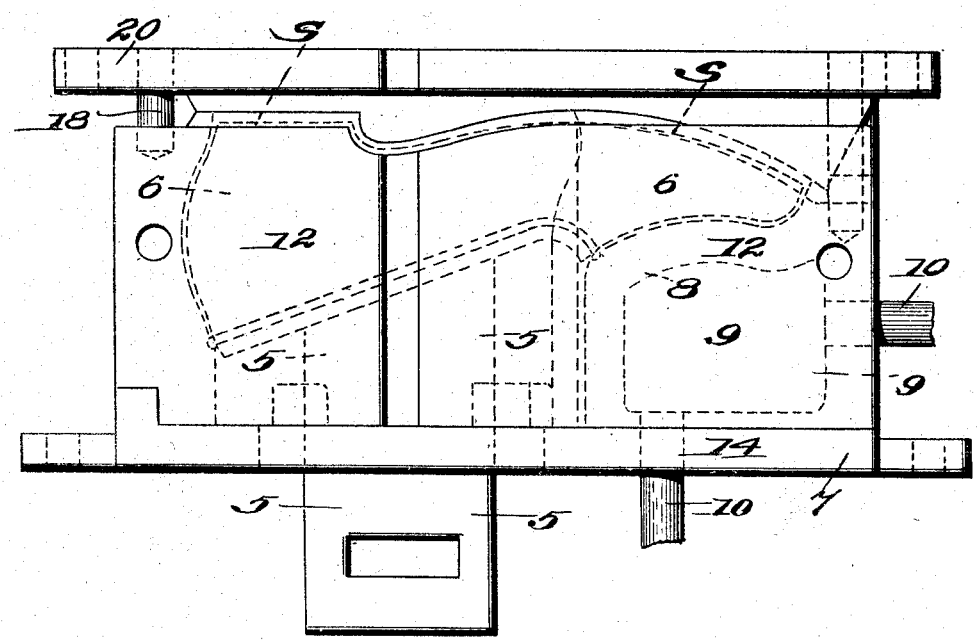
Figure 3:
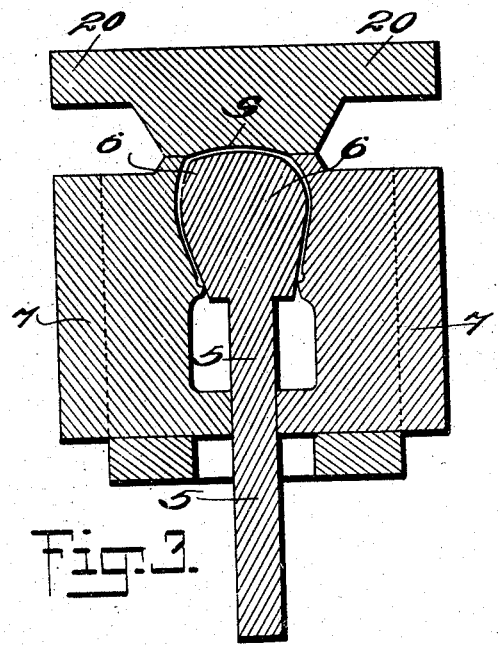
Figure 4:
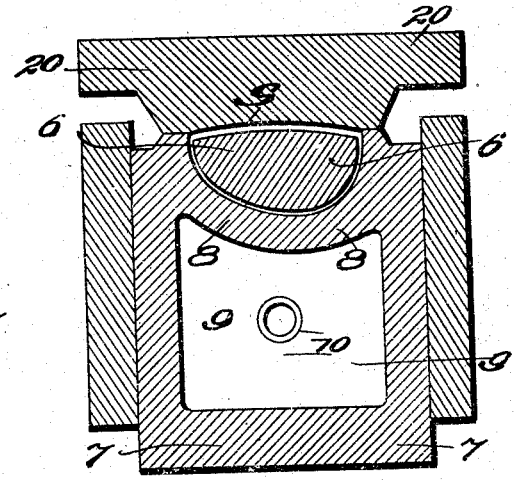
Figure 5:
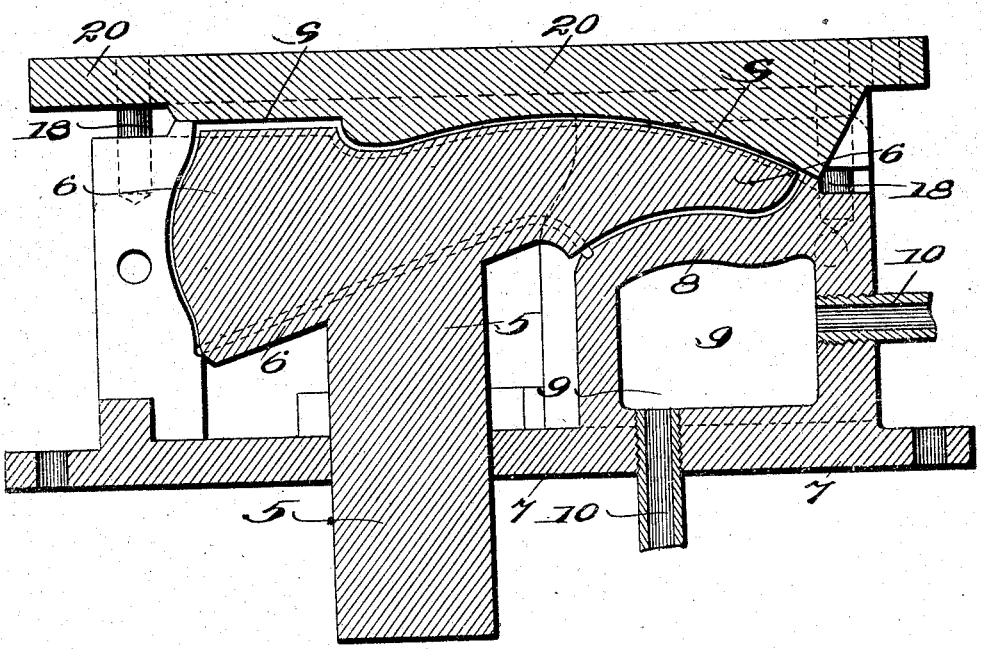
Figure 6:
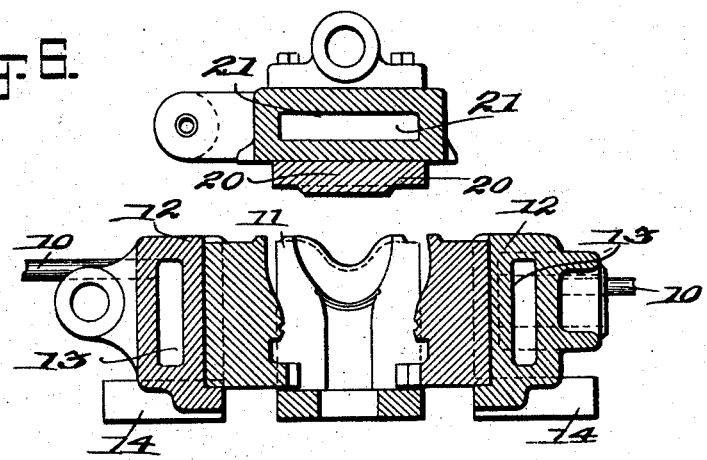
Figure 7:
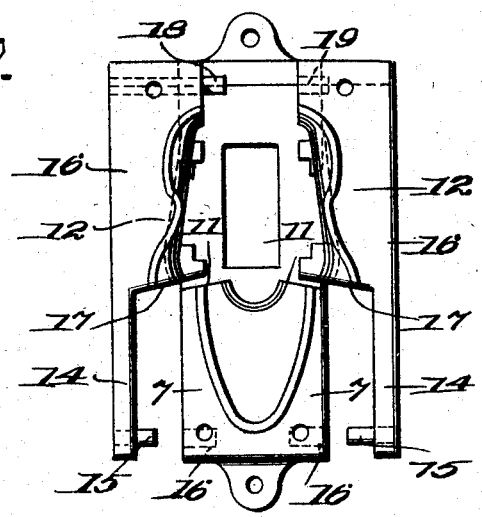

In the accompanying drawings, wherein like characters of reference indicate like parts in all the views, Figure 1 is a top plan view of my mold, which is formed in five parts, such view lacking the last or inner part and the without sole part. Fig. 2 is a view in side elevation of the mold complete, with the last in position, as shown in dotted lines. Fig. 3 is a transverse vertical sectional view taken through the five-part mold across the heel portion thereof. Fig. 4 is a similar view taken across the instep or sole portion of the shoe. Fig. 5 is a vertical longitudinal sectional view taken through my five-part mold and through the last. Fig. 6 is a cross-section showing the two side molds partially open and provided with their steam-chambers, the stationary vamp part, and the sole-mold with its supporting steam-chamber; and Fig. 7 is a plan view of the stationary or vamp parts and the two side parts partially open.

In describing my invention in detail I will refer particularly to Figs. 1, 2, 5, and 7, as these views show clearly the construction and arrangement of parts.

Referring now to the accompanying drawings in detail, 5 designates a last post or stem carrying the last or shoe-forming member 6, the preferred position being as shown in Fig. 5, with the sole portion of the last uppermost. Directly beneath the instep portion of the last is the stationary or instep part of the mold (indicated at 7) and comprises the molding-surface 8 in such shape as to receive the forward or vamp part of the shoe, said stationary mold part having a steam-chamber 9, heated by steam or other suitable agent through pipes 10. This instep or stationary mold part is suitably secured to the bed of the machine and terminates along the lines 11 11, shown in Figs. 1 and 7—that is to say, such stationary mold portion receives the instep portion of the shoe and a part of the opening therein. The side molds are shown at 12 12, each having a heating-chamber 13, so that molds are suitably heated by steam or other agent. These side molds are of the construction clearly shown in Figs. 1 and 7—that is to say, the forward parts 14 14 of such molds extend approximately parallel with the side of the instep or vamp mold part, and each of said extensions is provided with a pin 15, designed to enter the socket 16, formed in the stationary mold part. The parts 14 extend back to the main parts 16 of the side mold, which all carry the steam or heating chambers, and are beveled at their front ends, as at 17, to conform to the inclined rear edges 11 of the stationary or instep part of the mold. The side molds extend around the heel of the shoe and are constructed to meet at approximately the center of the back of the heel at the point 17', and one of said side mold parts at its rear is provided with a pin 18, designed to enter the socket 19, formed in the opposite side mold part. The top or sole mold is indicated at 20 and is suitably formed to mold the sole upon the shoe, which shoe in the drawings is indicated at S. This top mold 20 is also formed with a heating-chamber 21 for the purpose of employing the vulcanizing heat for the mold.

From the above description, taken in connection with the accompanying drawings, the construction, operation, and arrangement of my improved mold will be readily understood. The last, with the shoe made up thereon, is placed in the machine, such last comprising one part of the entire mold. The second part of the mold is the stationary or instep mold part, the construction of which has been heretofore described. The third and fourth parts of the mold are the side mold parts, which, as before stated, extend from the side of the shoe at a point to the rear of the instep back around the heel of the shoe, while the sole-mold forms the fifth part.

By employing a mold of this character the beads or ribs caused by the joining of the mold parts instead of appearing at the front or across the instep portion of the shoe will be at the line of junction of the instep-mold and the side mold and at the heel of the shoe.

A shoe molded in this manner presents somewhat the appearance of a blucher shoe, and the ribs or beads along the front of the instep are avoided.

It will of course be understood that any means may be employed for heating the molds or for joining the same.

The character of the mold parts themselves may be of any desired nature, as one of the principal features of the invention is to avoid the seam or web directly along the front or instep part of the shoe.

Having thus described my invention, what I claim as new, and desire to secure by Letters Patent, is—

1. A mold comprising a front member adapted to act as a mold for a portion of the instep, two side members, a sole-mold and a last for supporting the shoe to be molded.

2. The combination with a last for supporting the shoe to be molded, of a mold member for receiving the front portion of the shoe, side mold members for receiving that portion of the shoe between the front mold members and the heel, and a mold member for the sole.

3. A mold for rubber footwear comprising a last for supporting a shoe to be molded, and a plurality of mold members designed to receive the shoe and the last in such manner that the line of division of certain of the mold members will be at the sides of the opening in the shoe and at the heel.

4. A mold for rubber footwear comprising a last member for supporting the shoe to be molded, a front mold member and two side mold members, the line of division of such front and side mold members being at the sides of the last and at the rear or heel portion thereof, and a sole-mold member.

5. A mold for rubber shoes including a front mold member and two side mold members adapted to be closed about the shoe to be molded, the line of division, between the front member and the two side members being at the side of the shoe to be molded.

6. A mold for rubber shoes, comprising a last for supporting the shoe to be molded, a stationary front mold member for the instep portion of the shoe, two side mold members movable toward and from the last and the stationary member, and a sole-mold member.

7. A mold for making rubber footwear comprising a front mold member having beveled end portions, movable side mold members adapted to be moved toward and from the shoe to be molded, the line of division between the front member and the side member being at the side of the shoe, a mold member for the sole, said front member, the side members and the sole-mold having heating-chambers therein.

In testimony whereof I have signed my name to this specification in the presence of two subscribing witnesses.

MAURICE C. CLARK.

Witnesses:
R. B. CAVANAGH,
JOS. J. PIERANDO.